United States Patent [19]

Bennett et al.

[11] Patent Number: 4,951,398

[45] Date of Patent: Aug. 28, 1990

[54] MEASURING AND GUIDING ATTACHMENT FOR A CHAIN SAW

[76] Inventors: Robert W. Bennett; Arthur C. Mills, Sr., both of, Route 1 Box 1375, Yakima, Wash. 98901

[21] Appl. No.: 432,848

[22] Filed: Nov. 7, 1989

[51] Int. Cl.⁵ .................. B27G 23/00; B27B 17/00
[52] U.S. Cl. ........................................ 33/630; 30/383
[58] Field of Search ................. 33/630; 30/373, 376, 30/381, 383, 386, 387; 83/809, 810

[56] References Cited

U.S. PATENT DOCUMENTS

| | | | |
|---|---|---|---|
| 3,364,580 | 1/1968 | Lucia | 33/630 |
| 3,531,870 | 10/1970 | Romancky | 33/630 |
| 3,811,196 | 5/1974 | Smith | 33/630 |
| 4,233,739 | 11/1980 | Hiurichs | 33/630 |
| 4,299,034 | 11/1981 | DeBetta | 33/630 |
| 4,388,762 | 6/1983 | Debell, Jr. et al. | 33/630 |
| 4,545,122 | 10/1985 | Durfree, Jr. | 30/383 |
| 4,561,186 | 12/1985 | Keefe | 33/630 |

Primary Examiner—Allan N. Shoap
Assistant Examiner—William C. Dowling
Attorney, Agent, or Firm—T. M. Gernstein

[57] ABSTRACT

A measuring and guiding attachment for a chain saw includes a plurality of parts and is easily stored and deployed. The attachment has a swing arm assembly that is mounted on a front handle bar of the chain saw and a caliper plate attached to the distal end of that swing arm assembly. The swing arm assembly includes an end mortise and tenon joint and a telescoping joint, and the caliper plate is movably attached to the swing arm assembly so that the attachment has a plurality of degrees of freedom. A limit stop assembly is also included to permit further adjustment of the attachment.

9 Claims, 4 Drawing Sheets

MEASURING AND GUIDING ATTACHMENT FOR A CHAIN SAW

TECHNICAL FIELD OF THE INVENTION

The present invention relates to the general art of hand tools, and to the particular field of chain saws.

BACKGROUND OF THE INVENTION

In using a portable power driven chain saw to cut a log into shorter uniform length pieces, it has required a substantial time for the operator to measure off and mark the lengths of the pieces to insure that they are uniformly the correct length. Previously, this has often been done by an extra man who marks at points along the length of the log so that the sawing crew will know where to cut. This saves the sawing crew the added burden of having to stop after each cut to mark the next one, but since an extra man is required, the cost has been clearly apparent.

Alternatively, the sawing crew can mark for itself the places where to cut. Although in this case the extra effort is less obvious, actually it may be greater; the total time consumed just in measuring sometime becomes comparable to the time needed to make the cuts, especially when using modern high-powered saws which can cut an 8" tree in less than a minute.

Accordingly, the art has included measuring devices which can be fastened directly to the frame of a saw so that they do not require separate handling and which are always ready for use in measuring position.

However, these guides, while somewhat effective, still have several drawbacks that inhibit a user from making full use of the advantages provided by a chain saw having an attached automatic measuring and cutting guide. For example, such devices do not provide enough degrees of freedom to permit angled cuts while still being self-supporting. Thus, a simple flexible cord-like element, such as disclosed in U.S. Pat. Nos. 3,726,490 and 4,275,504, may permit cuts to be made at an angle with respect to each other, but require enough manual manipulation to be somewhat troublesome to use; whereas, rigid devices such as disclosed in U.S. Pat. No. 2,765,007 are self-supporting but do not readily facilitate the making of cuts in the workpiece that are angled with respect to each other.

Still further, none of the devices such as those mentioned above, are easily stored so that deployment of the guides is easily accomplished by as single operator.

Still further, none of these devices have the ability to be easily manufactured yet can stably retain a selected deployed configuration, especially if the measuring element is flexible.

Therefore, there is a need for a measuring and guiding attachment which is used on a chain saw and which has several degrees of freedom whereby cuts in a workpiece that are angled with respect to each other can be easily made without requiring the exercise of considerable manual dexterity, yet can be stored in an out-of-the way location and can still be easily deployed.

OBJECTS OF THE INVENTION

It is the main object of the present invention is to provide a measuring and guiding attachment which is used on a chain saw and which has several degrees of freedom.

It is another object of the present invention is to provide a measuring and guiding attachment which is used on a chain saw and which has several degrees of freedom whereby cuts in a workpiece that are angled with respect to each other can be easily made without requiring the exercise of considerable manual dexterity.

It is another object of the present invention is to provide a measuring and guiding attachment which is used on a chain saw and which has several degrees of freedom whereby cuts in a workpiece that are angled with respect to each other can be easily made without requiring the exercise of considerable manual dexterity, yet can be stored in an out-of-the way location and can still be easily deployed.

It is another object of the present invention is to provide a measuring and guiding attachment which is used on a chain saw and which has several degrees of freedom whereby cuts in a workpiece that are angled with respect to each other can be easily made without requiring the exercise of considerable manual dexterity, yet can be stored in an out-of-the way location and can still be easily deployed and manufactured.

It is another object of the present invention to provide a measuring and guiding attachment which is used on a chain saw and which has several degrees of freedom whereby cuts in a workpiece that are angled with respect to each other can be easily made without requiring the exercise of considerable manual dexterity, yet can be stored in an out-of-the way location and can still be easily deployed and manufactured and will stably retain a selected configuration.

SUMMARY OF THE INVENTION

These, and other, objects are achieved by a measuring and guiding attachment for use on a chain saw that has a telescoping swing arm assembly attached to the handle of the chain saw by a mounting unit and which includes an end mortise and tenon joint as well as a caliper plate that is attached to the swing arm assembly by a limit stop means that includes a locking pawl and a spring. The swing arm includes a spring attaching the mortise portion of the end mortise and tenon joint to the tenon portion of that joint, and the joint is capable of permitting the mortise portion to move with respect to the tenon portion. The connection of the swing arm assembly to the mounting unit includes a bolt element.

The elements are monolithic and are thus easily manufactured, and the locking pawl further ensures that, once a particular angular orientation of the caliper plate is selected, such angular orientation will be securely retained, even as the chain saw is moved. Measuring indicia are located on the attachment so the exact dimensions of the cut pieces can be selected and retained.

Because of these elements, the swing arm assembly can move in one plane with respect to the chain saw handle via the bolted connection of that swing arm to the mounting unit, the mortise and tenon elements can move in another plane and the caliper plate can move with still another degree of freedom with respect to the handle and the chain saw. The attachment is thus capable of accommodating a wide variety of cuts and orientations, and is still easily stored and deployed due to its collapsible, yet rigid, nature.

BRIEF DESCRIPTION OF THE DRAWING FIGURES

DETAILED DESCRIPTION OF THE PREFERRED EMBODIMENT OF THE INVENTION

Figure 1:
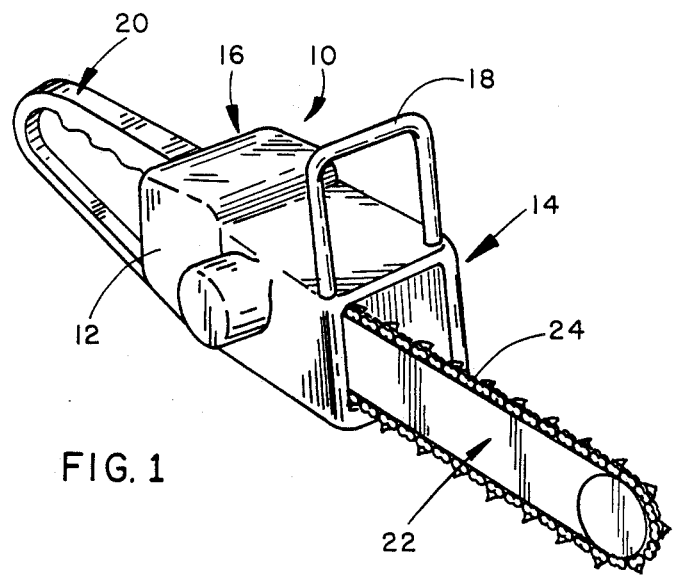
FIG. 1 is a perspective view of a chain saw on which can be used the measuring and guiding attachment of the present invention.
Figure 2:
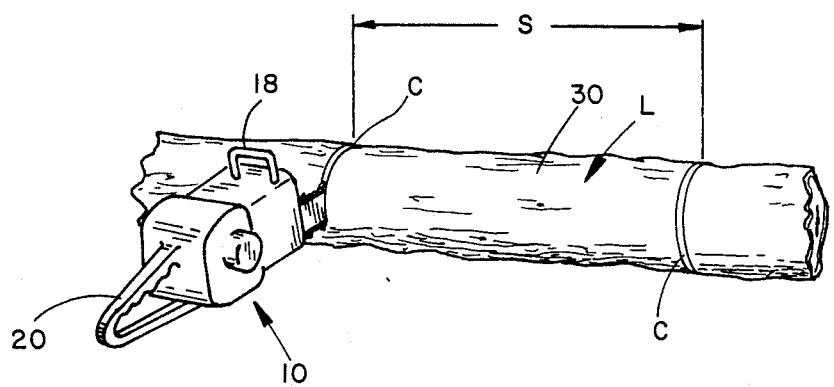
FIG. 2 is a perspective view of a chain saw having the measuring and guiding attachment of the present invention in use on a workpiece, such as a log.

Shown in FIGS. 1 and 2 is a chain saw 10 having a housing 12 with a forward end 14 and a rear end 16. A front handlebar 18 is attached to the front end of the housing and a rear handle 20 is attached to the rear end of the housing. A guide bar 22 is attached to a motor in the housing via the front end of that housing, and has a chain 24 operatively surrounding it. Cutters 26 are mounted on the chain and the chain is driven by the motor to define cuts, such as cut C, in workpieces, such as a log L shown in FIG. 2. The cuts C shown in FIG. 1 are parallel with each other, but there can be instances in which the cuts are at an angle with respect to each other. Furthermore, the cuts C may all be at a uniform spacing S. Accordingly, the chain saw 10 includes a measuring and guiding attachment 30 which permits the operator to make cuts at various angles with respect to each other while being easily deployed and stored yet being rigid in its operative and deployed position shown in FIG. 2. The attachment 30 is mounted on the front handlebar 18 to extend transverse to the handlebar 18 along the longitudinal extent of the workpiece.

Figure 3:
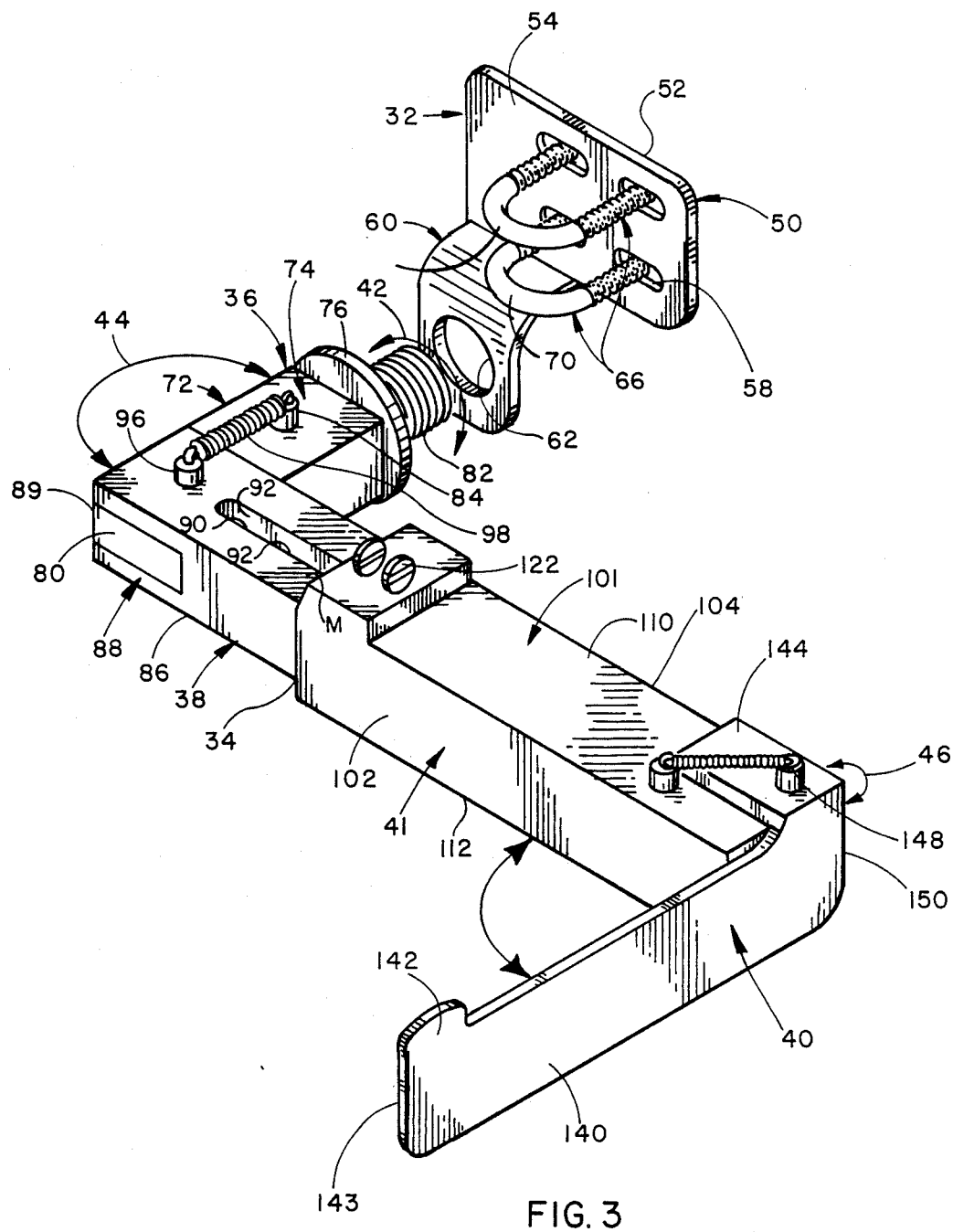
FIG. 3 is a perspective view of the measuring and guiding attachment of the present invention.

The measuring and guiding attachment 30 is best shown in FIG. 3. By way of introduction, the measuring and guiding attachment 30 includes a mounting unit 32 to which is attached a swing arm assembly 34 that includes a monolithic tenon element 36, a monolithic mortise element 38 and a monolithic telescoping collar element 41 having a monolithic caliper plate 40 mounted thereon. The attachment 30 has a plurality of degrees of freedom with respect to the chain saw which includes a first degree of freedom indicated by arrow 42 whereby the caliper plate 40 can be moved rotatably with respect to the front handlebar, a second degree of freedom indicated by arrow 44 whereby the caliper plate 40 can be moved in one plane with respect to the front handlebar, and a third degree of freedom indicated by arrow 46 whereby the caliper plate can be moved in the one plane but in a different direction with respect to the front handlebar. The caliper plate is used as the reference since it is the element used to define the location of the cut C in the workpiece. The swing arm is telescopic in nature so it can be extended into a deployed position from a stored condition, and can be extended to a length necessary to define the desired spacing S between cuts.

The mounting unit includes a monolithic base 50 that is rectangular and which has a rear surface 52 engageable with the front handlebar 18 and a front surface 54. Four oblong bracket holes, such as hole 58, are defined through the base 50, and an L-shaped outrigger arm 60 extends outwardly of the front surface 54. The outrigger arm 60 includes a bolt-receiving hole 62 defined therethrough.

Two U-bolt brackets 66 are received through the bracket holes and include external threads 68 which are located adjacent to the base rear surface 52 for receiving bolts (not shown) to attach the mounting unit to the front handlebar 18 by trapping such front handlebar between the bight sections 70 of the bolts and the base front surface 54.

The mounting unit 32 can be mounted on any suitable section of the front handlebar.

Figure 5:
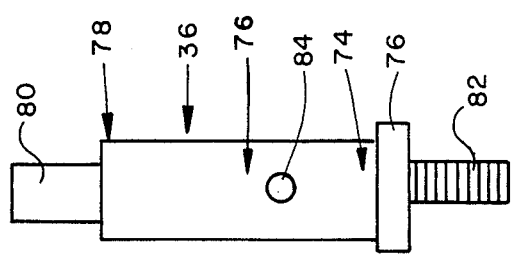
FIG. 5 is a top plan view of a tenon element included in the measuring and guiding attachment.
Figure 4:
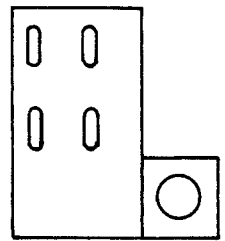
FIG. 4 is a top plan view of a mounting unit included in the measuring and guiding attachment.

The tenon element 36 is shown in FIGS. 3 and 5, and includes a body 72 having a lower portion 74 having a circular mounting element 76 thereon and an upper portion 78 having a tenon 80 thereon. An externally threaded shank 82 extends from the circular element 76 to be received through the hole 62. A bolt (not shown) is threaded onto the shank to trap the outrigger arm 60 between the circular element 76 and the bolt to mount the tenon element onto the mounting unit via the outrigger arm.

A spring anchor 84 is located on the body for a purpose to be discussed below.

Figure 6:
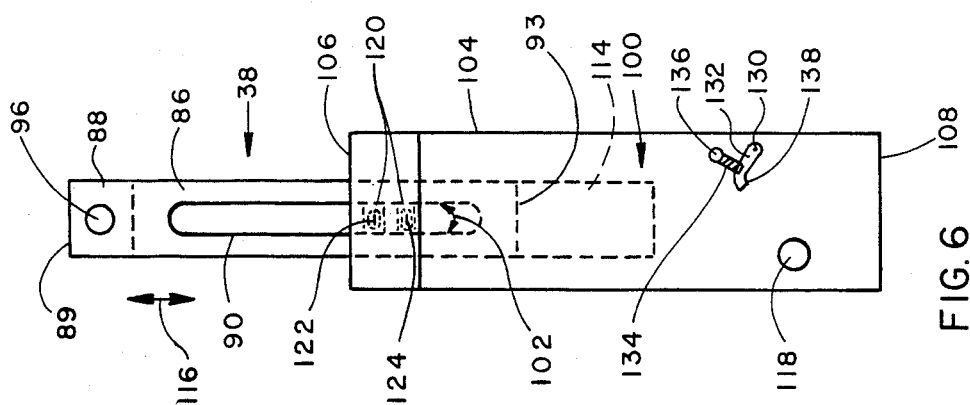
FIG. 6 is a top plan view of a mortise element telescopingly engaged with a collar element included in the measuring and guiding attachment.

The mortise element 38 is shown in FIGS. 3 and 6 and includes a rectangular body 86 having a mortise defining yoke 88 on one end 89 thereof and an elongated slot 90 defined therethrough. The slot 90 has sides 92 and a width as defined between such sides and extends from adjacent to the one end 89 to adjacent to the other end 93 of the body 86.

A spring anchor 96 is located adjacent to the one end 89, and a spring 98 is attached at one end thereof to the spring anchor 84 and at the other end thereof to the anchor 96 to hold the tenon 80 in the mortise yoke 88.

The telescoping collar 41 is shown in FIGS. 3 and 6 and includes an elongated telescoping collar element 100 having a rectangular peripheral shape which has sides 102 and 104, a first end 106 connected to the tenon element and a second end 108 with its width dimension being defined between the sides 102 and 104 and its thickness dimension being defined between a top surface 110 and a bottom surface 112.

The collar body also includes a longitudinal centerline and a blind-ended bore 114 that is defined to extend along that centerline from the collar first end 106. The bore 114 is sized to slidably receive the mortise body 86 in telescoping fashion so that the body 86 can move into and out of the bore in the directions indicated in FIG. 6 by double-headed arrow 116. This permits the swing arm to extend varying distances from the mounting unit 32 whereby different spacings S can be established between cuts C in a workpiece.

Two jam element receiving bores 120 are defined through the body 100 from the top surface 110 thereof to intersect the blind-ended bore 114 near the first end 106. The purpose of these jam element receiving bores will be discussed below.

A spring anchor 118 is located on the top surface 110 near the second end 108 for a purpose that will be discussed below.

Two jamming elements 120 are received in the jam element receiving bores to extend through the body 100 into the blind-ended bore. Each of the elements 120 includes a fingerhold portion 122 located above the top surface 110, a body extending through the surface and a jamming portion 124 that is located inside the blind ended bore. Each of the jamming portions is elliptical in cross section and has a major axis that is longer than the width dimension of the slot 90 and a minor axis that is shorter than the width of the slot 90. The jamming portions are located in the slot 90, and the elements are rotated about their longitudinal axes in the directions indicated by double-headed arrow 126. The jamming elements thus can assume a jamming position with the ends thereof snugly engaging the sides of the mortise body adjacent to the slot 90 or a releasing position with the ends of the jamming portions disengaged from the sides of the mortise body.

A pawl element pivot 130 is located on the top surface 110 near one side 104 and near the second end 108 and serves as a pivot for a pawl element 132 mounted thereon. The pawl element is biased upwardly to the first end 106 and sideways toward the side 104 by a spring 134 that is attached at one end to the pawl and at the other end to a spring anchor 136 located on the body 100 near the side 104. The pawl includes a tooth 138 that extends toward the first end 108 for a purpose that will be evident from the ensuing discussion.

Figure 8:
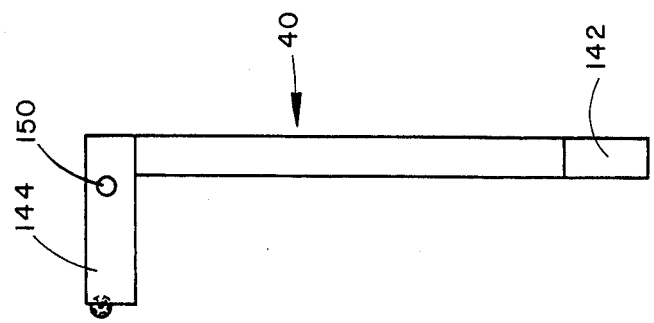
FIG. 8 is a side elevational view of the caliper plate included in the measuring and guiding attachment.
Figure 7:
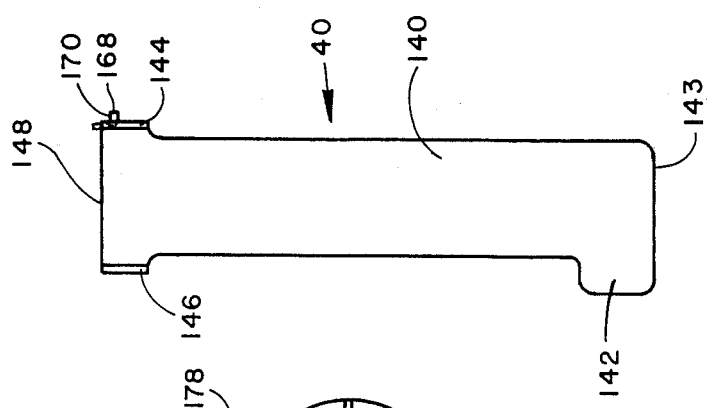
FIG. 7 is a top plan view of a caliper plate included in the measuring and guiding attachment.

The caliper plate 40 is shown in FIGS. 3, 7 and 8 as including a body 140 having a lobar element 142 adjacent to a distal end 143 thereof and two spaced apart ears 144 and 146 adjacent to a proximal end 148 thereof. The ears 144 and 146 are spaced apart a distance that corresponds to the thickness of the collar element body 100 to snugly receive the collar element body 100 therebetween as shown in FIG. 3 in a manner that permits the caliper plate to move in the direction 46.

A spring anchor 150 is located on the ear 144, and a spring 152 is connected at one end to the caliper element spring anchor 150 and at the other end to the collar element spring anchor 118 to bias the caliper element into the FIG. 3 position on the telescoping collar element.

Figure 11:
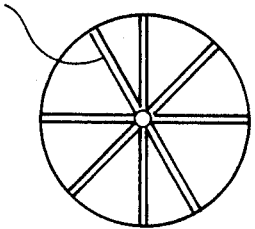
FIG. 11 is a schematic plan view of a plurality of rectangular slots that are used to establish a chosen angular orientation of a caliper plate element with respect to a collar element of a swing arm assembly of the measuring and guiding attachment.
Figure 10:
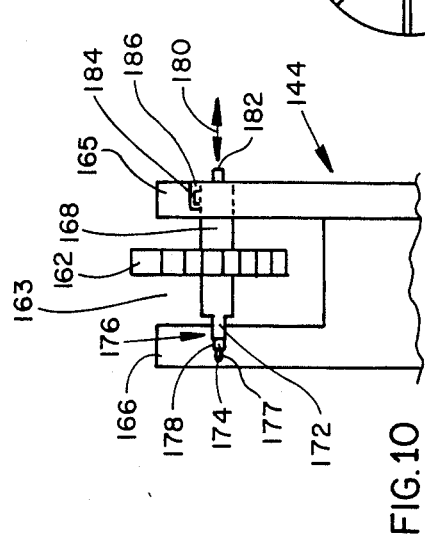
FIG. 10 is a schematic illustrating a ratchet gear portion of a limit stop means of the measuring and guiding attachment.
Figure 9:
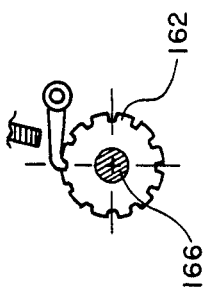
FIG. 9 is a top plan view of a locking pawl unit included in the measuring and guiding attachment of the present invention.

The caliper plate is adapted to assume several angular orientations with respect to the collar element body 100 from the perpendicular position shown in FIG. 3 to a collinear position one hundred eighty degrees from the FIG. 3 position. A limit stop means 160 serves to hold the caliper plate in the selected angular orientation, and is shown in FIGS. 3, 9 and 10 to include a ratchet gear 162 mounted in a slot 163 defined in the ear 144 in an end 164 of that ear. The slot 163 has a side 165 and a side 166, and the ratchet gear extends into a position to establish meshing engagement with the pawl 132. The ratchet gear is mounted on an axle 168 for rotation therewith. The axle is movable in the ear 144 from a first position with an end 170 thereof extending out of the ear side 165 and which is freely rotatable on the ear, to a second position in which the end of the axle is flush with the outer surface of the ear. In the flush condition, shown in FIG. 10, the ratchet gear is prevented from rotating. The axle has a flat portion 172 adjacent to a pin 174 on an end 176. The pin 174 engages and remains engaged with a pin hole 177 defined in the ear side 166 and the pin is rotatable in such pin hole. A rectangular slot 178 is defined in the ear side 166 adjacent to the pin hole, and the axle 168 is movable in the directions indicated in FIG. 10 by the double-headed arrow 180 from a first, rotation preventing position in which the outer end 170 is flush with the ear outer surface so that the axle is prevented from rotating by the flat 172 engaging the ear side 166 adjacent to the rectangular slot 178. As shown in FIG. 11, there are a plurality of angularly spaced apart rectangular slots 178 that radiate outwardly of the pin hole. The axle 168 is rotated after it has been moved to the outward position from one rectangular slot to another to change the angular orientation of the ear and hence the caliper plate with respect to the body 100. The axle free end is shown in its outward, position in FIG. 7, and in its flush, locked, position in FIG. 10. In the outward position, the axle is pulled out of the by a fingerbail 182 to free the flat 172 from engagement with the ear side 166 with the pin remaining engaged in the pin hole so that the axle is outward position, and the ratchet gear can be rotated. The axle is locked to the ear side 165 by a key 184 on the axle that is received in a keyway slot 186 on the ear side 165.

The ratchet gear 162 has a plurality of gear teeth 186 separated by spaces 188, with the spacing between the gear teeth corresponding to the spacing between the slots 178 so that the gear so that the gear pitch of the ratchet gear corresponds to the angular spacing between the slots 178. This will permit the gear teeth to be engaged by the pawl so as to keep the axle properly engaged in the rectangular slots. This will further ensure that the angular relationship selected for the caliper plate will be retained.

In this manner, as the axle is rotated, the ear and the caliper plate will change the angular orientation with respect to the body 100, yet when the axle can still be moved in the directions indicated by arrow 180 while still remaining locked to the ear side 165. The pawl is pulled back against the bias of the spring 134 to free the ratchet gear, and the caliper plate is moved into the desired angular orientation with respect to the telescoping collar body 100 by freeing the axle from the rectangular slot 178, rotating the ratchet gear, and hence the caliper plate, and then re-engaging the flat 172 into a new rectangular slot at the chosen angular orientation. The ratchet axle is pushed into the FIG. 10 locked position and the pawl released so the caliper plate is then locked in the selected angular orientation.

When the pawl is in the FIG. 6 raised condition against the bias of spring 134 and the axle is in the FIG. 7 outward position out of engagement with the rectangular slot in ear 144, the ratchet gear can rotate and the caliper plate can be moved angularly with respect to the body 100; whereas, when the pawl is free to move under the bias of the spring 134, it will mesh with the gears of the ratchet gear and when that ratchet gear axle is forced flush into the ear with its flat end engaged in the rectangular slot, the ratchet gear is prevented from rotating.

Indicia, such as guide and measuring marks M, are located on the swing arm assembly, especially on the mortise element so that the telescoping collar element can be moved to an exact location. This permits the dimension S to be precisely defined and such dimension will be retained during a cutting operation.

It is understood that while certain forms of the present invention have been illustrated and described herein, it is not to be limited to the specific forms or arrangements of parts described and shown.

We claim:

1. A measuring and guiding attachment for use on a chain saw comprising:
   (A) a mounting unit which includes
      (1) a monolithic base having bracket holes defined therethrough and an L-shaped outrigger arm having a bolt-receiving hole defined through one leg thereof, and
      (2) two U-bolt brackets which extend through said base holes, each U-bolt bracket having external threads thereon to attach said mounting unit to a front handlebar of a chain saw;
   (B) a monolithic tenon element which includes
      (1) a body having a lower portion and a tenon on an upper portion and a spring anchor on said body,
      (2) a circular mounting element on said lower portion, and
      (3) an externally threaded shank extending from said tenon element circular mounting element to fit through said mounting unit outrigger arm bolt-receiving hole for threaded engagement with a bolt to attach said tenon element to said mounting unit;
   (C) a monolithic mortise element which includes
      (1) a rectangular body having a mortise defining yoke on one end thereof and an elongated slot defined therethrough, said slot having sides and a width dimension as measured between said sides,
      (2) a spring anchor near said mortise element body one end, and
      (3) said mortise defining yoke receiving said tenon element to form an end mortise and tenon joint to couple said tenon element to said mortise element;
   (D) a first spring anchored at one end thereof to said tenon element spring anchor and at another end thereof to said mortise element spring element anchor;
   (E) a monolithic telescoping collar element which includes
      (1) an elongated rectangular body having a top surface and a bottom surface and a thickness dimension measured between said top surface and said bottom surface,
      (2) a blind-ended bore in said telescoping collar element body and which extends longitudinally of said collar element body from a collar element body first end, said blind-ended bore being sized and shaped to slidably receive said mortise element rectangular body so that said mortise element body can slide into and out of said blind-ended bore,
      (3) two jamming element receiving bores defined through said telescoping collar element body near said collar element body first end to intersect said blind-ended bore,
      (4) a spring anchor on said top surface and located near a second end of said telescoping collar element body,
      (5) coupling means for attaching said mortise element to said telescoping collar element, said telescoping collar element coupling means including two jamming elements each having
         (a) a fingerhold portion,
         (b) a body portion extending through one of said jamming element receiving holes,
         (c) a jamming portion which is elliptical in cross sectional shape and has a major axis that is larger than said mortise element blind-ended slot width and a minor axis that is smaller than said mortise element blind-ended bore slot width,
      (6) each of said jamming elements being rotatably received in said jamming element receiving holes to move between a jamming position with said jamming portions snugly engaging said mortise element body adjacent to said mortise element slot and a releasing position with said jamming portions disengaged from said mortise element body,
      (7) a pawl element pivot on said top surface and located adjacent to said telescoping collar element body second end;
   (F) a pawl element pivotally mounted on said pawl element pivot pin;
   (G) a monolithic caliper plate which includes
      (1) a body,
      (2) a lobar element on a distal end of said caliper plate body
      (3) two ears on a proximal end of said caliper plate body,
      (4) said ears being spaced apart a distance which corresponds to the thickness of said telescoping collar element body to receive said telescoping collar element body therebetween,
      (5) a spring anchor on one ear of said two ears, and
      (6) a ratchet gear mounting axle on said one ear;
   (H) a second spring anchored at one end thereof to said telescoping collar element spring anchor and at another end thereof to said caliper plate spring anchor; and
   (I) a ratchet gear mounted on said ratchet gear mounting pin for engaging said pawl element.

2. The measuring and guiding attachment defined in claim 1 wherein said one ear includes a ratchet gear receiving slot defined from a top end thereof with said ratchet gear mounting axle extending across said ratchet gear receiving slot, said one ear having a first side defining one side of said slot and a second side defining a second side of said slot.

3. The measuring and guiding attachment defined in claim 2 further including a keyway defined in said ear one side and a key on said ratchet gear axle which slides in said keyway slot.

4. The measuring and guiding attachment defined in claim 3 further including a pin hole defined in said ear second side and a pin on said ratchet gear axle that is received in said pin hole.

5. The measuring and guiding attachment defined in claim 4 further including a first rectangular slot defined in said ear second side to intersect said pin hole and a rectangular flat portion on said ratchet gear axle that is sized to engage said rectangular slot.

6. The measuring and guiding attachment defined in claim 5 further including a plurality of other rectangular slots intersecting said first rectangular slot and intersecting said pin hole, said other rectangular slots being angularly arranged on said ear second side.

7. The measuring and guiding attachment defined in claim 6 further including measuring indicia on said mortise element body.

8. The measuring and guiding attachment defined in claim 7 wherein said ratchet gear has a plurality of gear teeth that are spaced apart on a specified pitch, with said specified pitch corresponding to the angular spacing between said rectangular slots.

9. The measuring and guiding attachment defined in claim 8 further including a fingerbail on said ratchet gear axle.

* * * * *